United States Patent [19]

Satou et al.

[11] 3,986,399
[45] Oct. 19, 1976

[54] FILLED-IN-FLUID AND DIAPHRAGM TYPE INTERMEDIATE DEVICE FOR TRANSMITTING PRESSURE

[75] Inventors: Keiichi Satou; Takeo Nagata, both of Hitachi; Yosimi Yamamoto, Katsuta, all of Japan

[73] Assignee: Hitachi, Ltd., Japan

[22] Filed: Dec. 21, 1973

[21] Appl. No.: 427,126

[30] Foreign Application Priority Data
Dec. 25, 1972 Japan............................. 48-129405

[52] U.S. Cl.................................... 73/395; 73/406
[51] Int. Cl.².............................................. G01L 7/08
[58] Field of Search.......... 73/395, 299, 406, 407 R, 73/420; 128/2.05 D

[56] References Cited
UNITED STATES PATENTS

| | | | |
|---|---|---|---|
| 3,400,588 | 9/1968 | O'Connor............................. | 73/407 |
| 3,492,872 | 2/1970 | Caspar et al........................... | 73/407 |
| 3,596,520 | 8/1971 | Sanford.............................. | 73/407 R |

*Primary Examiner*—Donald O. Woodiel
*Attorney, Agent, or Firm*—Craig & Antonelli

[57] ABSTRACT

A filled-in-fluid and diaphragm type intermediate device for transmitting pressure and for use with a pressure, liquid level or flow rate transmitter is disclosed, which enables the measurement of the pressure, liquid level or flow rate at a high temperature by using a conventional transmitter.

This device includes a fluid-contacting flange having mounted thereon a pressure receiving element and coupled to a flange provided on the side of a fluid to be measured. A sealing flange having mounted thereon a diaphragm is provided on the side of a meter proper. A pressure transmitting pipe is coupled to the fluid-contacting flange and to the sealing flange, and contains therein a pressure-transmitting fluid which is adapted for use at a high temperature or as anti-radiant-ray fluid.

25 Claims, 8 Drawing Figures

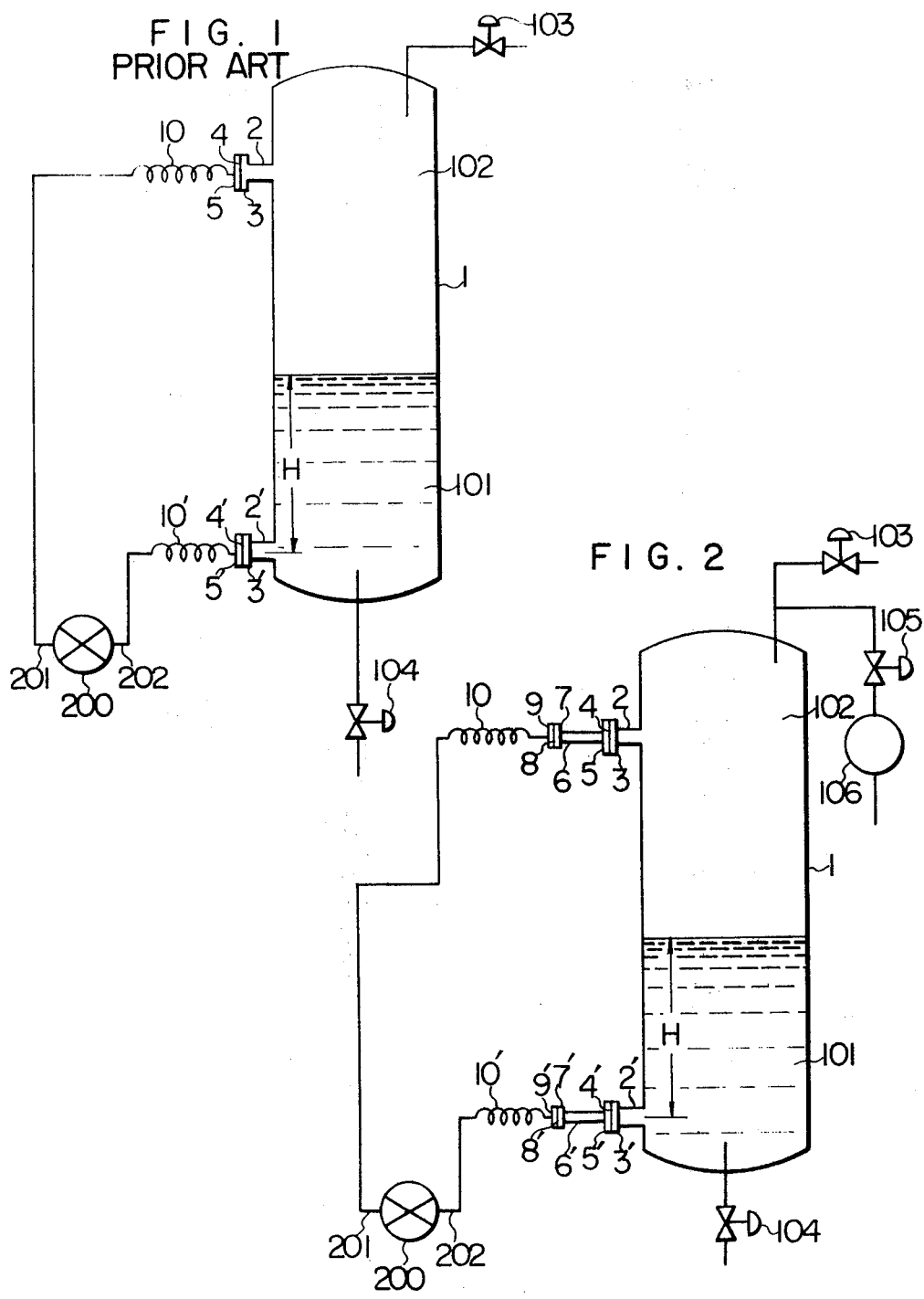

FILLED-IN-FLUID AND DIAPHRAGM TYPE INTERMEDIATE DEVICE FOR TRANSMITTING PRESSURE

This invention relates to a filled-in-fluid and diaphragm type intermediate device for transmitting pressure and for use with a pressure, liquid level, or flow rate transmitter, and more particularly to a filled-in-fluid and diaphragm type multiple intermediate device for transmitting pressure.

Recently, in line with the increase in scale of chemical, thermal power and atomic energy plants, process factors such as pressure, liquid level and flow rate have been confronted by increase in operational temperature and pressure. The limit of the operational temperature used in the pressure, liquid level or flow rate transmitter now in use is in the neighborhood of 90°C. Accordingly, in cases where the temperature of the fluid to be measured is above 100°C, a filled-in-liquid and diaphragm type intermediate device is used in combination between the fluid to be measured and the transmitter which device consists of a pressure receiving diaphragm separating a fluid to be measured from a pressure transmitting filled-in-liquid which is adapted to transmit a pressure to the transmitter and a pressure-transmitting small diameter pipe containing therein said filled-in-liquid adapted to transmit pressure of the fluid to be measured therethrough.

In general, the length of the small diameter pipe for transmitting a pressure therethrough is 1 to 10 meters in an ordinary plant, and the inner diameter of the pressure transmitting small diameter pipe ranges from 2 to 4 mm, while the amount of the filled-in-liquid should preferably be minimized so as to minimize the expansion rate of the entire liquid. Since the pressure transmitting filled-in-liquid is used as a pressure transmitting medium and hence should preclude gas inclusion and dissolution therein, the liquid is usually filled in such a pipe by using vacuum substituting technique. Accordingly, the pressure-transmitting filled-in-liquid is required to present a minimized expansion coefficient, saturated vapor pressure, surface tension and viscosity, as well as high heat resistance. Included by filled-in-liquids which meet such requirement are silicon oil and fluro carbon, and those oils are finding the wide range of use at the present time. However, the limit of the operational temperature of such an oil is only about 200°C. Thus, those oils are not adapted for use in plants which recently have to measure fluid at a temperature of a several hundred degrees centigrade.

It is an object of the present invention to provide a filled-in-fluid and diaphragm type intermediate device for transmitting pressure which, even in case the temperature of fluid to be measured exceeds 200°C, enables the measurement of process factors such as pressure, liquid level, flow rate and the like by using a conventional air or electronic type transmitter.

According to the present invention, there is provided a filled-in-fluid and diaphragm type intermediate device for transmitting pressure which comprises a pressure-receiving element mounted on a fluid-contacting flange and separating a fluid to be measured from filled-in-fluid adapted for transmitting pressure at the fluid-contacting flange; and a container having openings at the opposite ends thereof and having one end coupled to said fluid-contacting flange and the other end thereof coupled to a seal-portion flange mounting thereon a diaphragm on the side of a meter proper, the container containing therein said filled-in-fluid for transmitting pressure therethrough.

These and other objects and features of the present invention will be clear from a reading of the ensuing part of the specification with reference to the accompanying drawings.

FIG. 1 is a schematic view of a process, to which the present invention is applied;

FIG. 2 is an outline showing an embodiment of the present invention which is applied to a liquid level transmitter;

Figure 5:
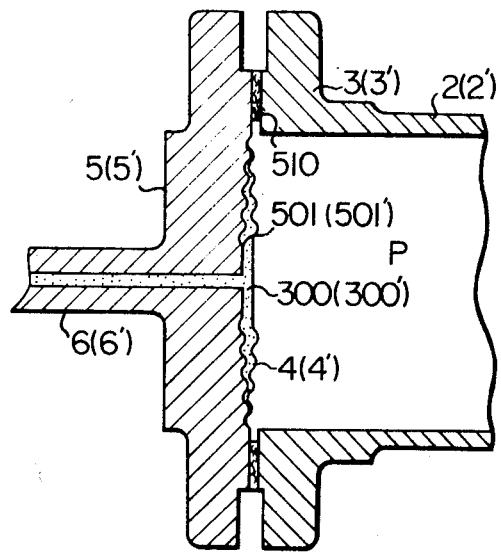
Figure 6:
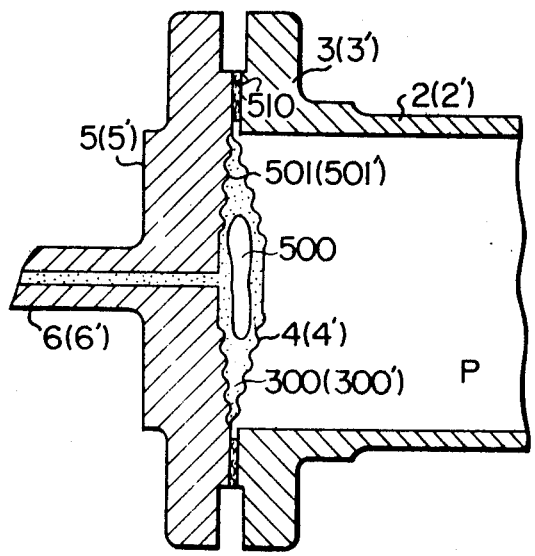
Figure 7:
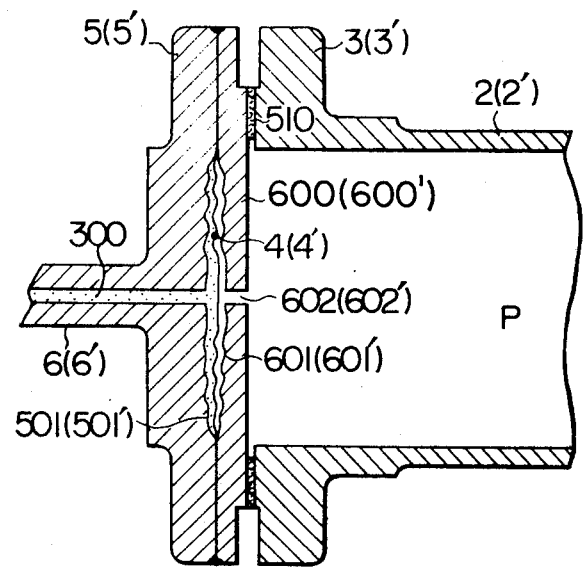
Figure 8:
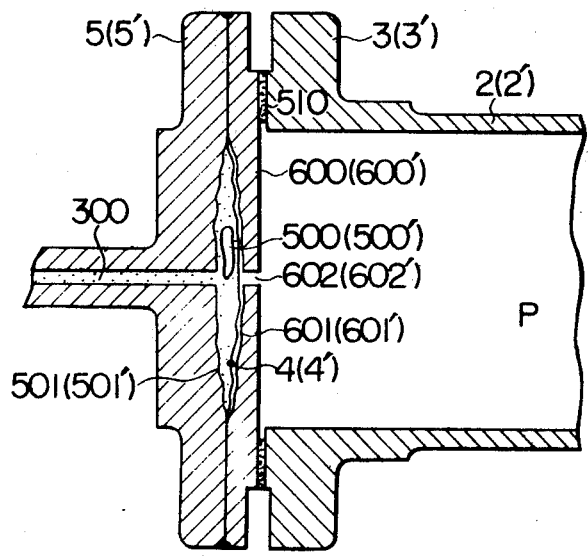

FIGS. 5 and 6 a longitudinal cross-sectional views of a pressure receiving portion consisting of a conventional liquid-contacting-flange and a pressure receiving diaphragm, respectively; and FIGS. 7 and 8 are longitudinal cross-sectional views of a pressure receiving portion according to the present invention which consists of a fluid-contacting flange and a pressure receiving diaphragm, respectively.

One example of a process, to which is applied the present invention, will now be described with reference to FIG. 1.

Shown at 1 is a tank which contains a fluid 101 to be measured, while the amount of the liquid to be introduced therein is adjusted by means of valves 103 and 104. Shown at 102, in general, is gas or vapor, and at 200 is a liquid level transmitter adapted to measure a liquid level H. The low pressure inlet 201 of the liquid-level transmitter 200 is connected through the liquid filled in a pressure-transmitting small diameter pipe 10 and to a filled-in-liquid and diaphragm type intermediate device consisting of a pressure-receiving diaphragm 4 adapted to be displaced due to the pressure of the fluid to be measured and a liquid-contacting flange 5 mounting the diaphragm 4 thereon. The liquid-contacting flange 5 is gas tightly coupled to a flange 3 which in turn is coupled through a pipe 2 to the tank 1. On the other hand, a high pressure inlet 202, like in the previous case, is connected through the pressure-transmitting-fluid filled in a pressure-transmitting small diameter pipe 10' to a filled-in-liquid and diaphragm type intermediate device consisting of a pressure-receiving diaphragm 4' adapted to be displaced due to the pressure of the fluid to be measured and a liquid-contacting flange 5'. The aforesaid liquid-contacting flange 5' is gas tightly coupled to a flange 3' which in turn is coupled through a pipe 2' to the tank 1. In the drawing, there is shown an example where the flanges 3 and 3' are coupled through pipes 2 and 2' to the tank 1 and also coupled to the liquid-contacting flanges 5 and 5' in gas tight relation, respectively. However, it is understood that the liquid-contacting flanges 5 and 5' may directly be coupled to the side wall of the tank 1.

It is apparent from FIG. 1 that a liquid level transmitter combined with a conventional filled-in-fluid and diaphragm type intermediate device as shown is not adaptable for use in situations where the temperature of a fluid to be measured is as high as several hundred degrees centigrade.

The present invention is directed to avoiding the aforesaid shortcomings involved in the prior art. The description will now be given to the embodiments of the present invention with reference to FIGS. 2 to 4 and 7 to 8.

Referring to FIG. 2, shown at 1 is a tank which contains a fluid 101 to be measured, while the amount of the fluid to be introduced therein is adjusted by means of valves 103 and 104. Shown at 102, in general, is gas or vapor. Shown at 200 is a liquid level transmitter, and as required, an air type liquid-level transmitter or electronic type liquid level transmitter may be used for measuring a liquid level H. The low pressure inlet 201 of the liquid level transmitter 200 is connected through a first filled-in-fluid and diaphragm type intermediate device, to a high-temperature filled-in fluid and diaphragm type intermediate device for transmitting pressures. The first filled-in-fluid and diaphragm type intermediate device consists, as in FIG. 1, of a pressure-transmitting small diameter pipe 10, in which is filled pressure transmitting liquid such as silicon oil, and a seal-portion flange 9 mounting thereon a seal diaphragm which separates the fluid in the pipe 10 from the filled-in-fluid provided in the high temperature filled-in-fluid and diaphragm type intermediate device. The high temperature intermediate device consists of a sealing flange coupled gas tightly to the flange 9, a pressure transmitting pipe 6, in which is filled a high-temperature-use, filled-in-fluid for a fluid-contacting portion, and a fluid-contacting flange 5 incorporating a pressure receiving diaphragm 4 therein. The high-temperature intermediate device is gas tightly coupled to the fluid-contacting-portion flange 5 and then connected to the tank 1 through a flange 3 coupled to the pipe 2. On the other hand, a high pressure inlet 202 of the transmitter 200, as in the previous case, is connected to the tank 1. As shown, in FIG. 2, the flanges 3 and 3' are connected through pipes 2 and 2' to the tank 1, respectively, while the flanges 3 and 3' are coupled to fluid-contacting-flanges 5 and 5'. However, the fluid-contacting flanges 5 and 5' may directly be affixed to the side wall of the tank 1.

Figure 3:
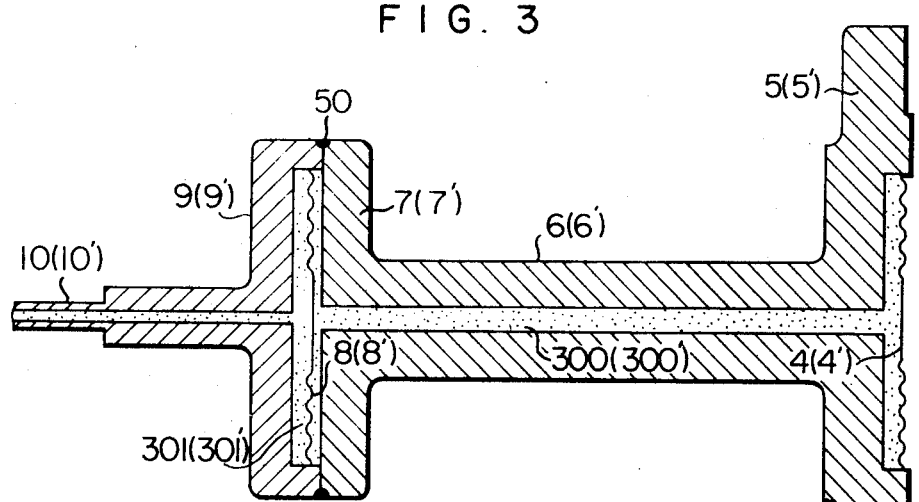
FIG. 3 is a longitudinal cross-sectional view, showing in detail a filled-in-fluid and diaphragm type multiple intermediate device according to the present invention.

FIG. 3 is a longitudinal cross-sectional view showing, in detail, a filled-in-fluid and diaphragm type multiple intermediate device according to the present invention, in which however the low pressure inlet of the transmitter is identical in construction to that of the high pressure inlet thereof, such that the ensuing description will be given only on the low pressure inlet. However, the reference numerals given in FIG. 3 are commonly used with FIG. 2. Now, detailed description will be given to the gist and embodiments of the present invention with reference to FIG. 3, although there may be duplication in some part of the description with that on FIG. 2. The filled-in-fluid and diaphragm type intermediate device for transmitting pressure consists of a high-temperature fluid and diaphragm type intermediate device and a filled-in-liquid and diaphragm type intermediate device. The high-temperature fluid and diaphragm type intermediate device consists of a pressure receiving diaphragm 4, a fluid-contacting flange 5, a sealing flange 7 and a high-temperature filled-in-fluid 300. The other filled-in-liquid and diaphragm type intermediate device consists of a seal diaphragm 8, seal-portion flange 9, pressure-transmitting small diameter pipe 10 and pressure transmitting filled-in-liquid 301. The seal-portion flange 7 is sealingly coupled to the flange 9 in a seeal portion 50. The pressure receiving diaphragm 4 may be made of stainless steel, tantalum, hastelloy, monel or the like, as required, separating the fluid to be measured from the high-temperature filled-in-fluid 300 as well as the transmitting pressure from the fluid to be measured. However, because the temperature of the fluid to be measured is as high as several hundred degrees centigrade, the diaphragm 4 is welded to the liquid-contacting-portion flange 5. In passing, the flanges 5 and 7 plus pressure transmitting pipe 6 are integrally constructed or welded to each other so as to give an integral construction. Although the pressure transmitting pipe 6 serves as a heat-radiating pipe, an additional heat radiating plate may be provided therefor. The high-temperature filled-in-fluid 300 is excellent in heat resistance and hence will not be deteriorated at a high temperature nor gelated, while presenting low saturated vapor pressure.

A high-temperature diaphragm type intermediate device of such a construction will not cause gelation in the high-temperature filled-in-fluid 300 even in case the temperature of the fluid to be measured is as high as several hundred degrees centigrade or will not generate gas or vapor to thereby break the diaphragms 4 and 8. Furthermore, since the aforesaid pressure-transmitting pipe 6 and flanges 5 and 7 radiate heat, the temperature at seal diaphragm 8, sealing flange 9, pressure-transmitting small diameter pipe 10 and pressure-transmitting filled-in liquid may be maintained below 200°C, such that conventional type filled-in-liquid and diaphragm type intermediate device for transmitting pressure may be used intact.

In passing, high-temperature-use silicon oil or mercury may be used as the aforesaid high-temperature filled-in fluid 300. The high-temperature-use silicon oil having a desired heat resisting temperature may be prepared depending on courses of synthesis.

Figure 4:
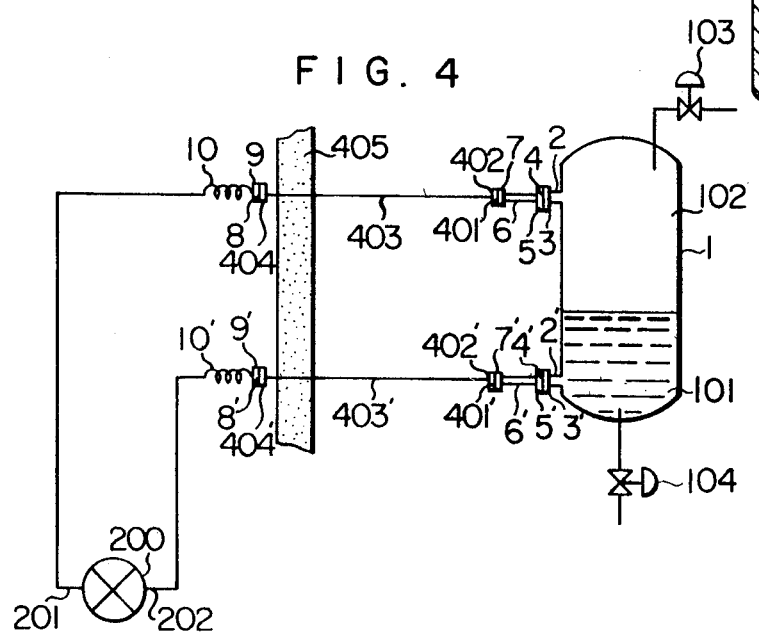
FIG. 4 is a schematic view of a filled-in-fluid and diaphragm type intermediate device according to the present invention which is used in an atomic energy plant.

While the description has been given with reference to FIGS. 2 and 3, a filled-in-fluid and diaphragm type multiple intermediate device composed of a high-temperature fluid and diaphragm intermediate device, and a filled-in-liquid and diaphragm type intermediate device, a filled-in-fluid and diaphragm type multiple intermediate device for high temperature process, such as used in an atomic energy plant, will be referred to hereinafter. Considering the influence of the radioactivity, it is preferred to use a fluid and diaphragm type multiple intermediate device which consists of a high-temperature fluid and diaphragm type intermediate device, a anti-radiant ray, filled-in-fluid and diaphragm type intermediate device and an ordinary type filled-in-liquid and diaphragm type intermediate device. FIG. 4 shows an outline of the embodiment thereof. The same reference numerals are used for the similar parts in common with FIG. 2. Anti-radiant ray, filled-in-fluid and diaphragm type intermediate device consists of sealing flanges 402 and 402' incorporating seal diaphragms 401 and 401' therein, pressure transmitting small diameter pipes 403 and 403', in which is filled an anti-radiant ray pressure-transmitting-filled-in-fluid, and sealing flanges 404 and 404' which are gas tightly coupled to sealing flanges 9 and 9'. Shown at 405 is a concrete wall which shields radiant rays. Employed as anti-radiant ray pressure transmitting fluid which is filled in prssure transmitting small diameter pipes 403 and 403', are those materials, which will not be solidified, when exposed to radiant rays, such as NaK (Eutectic crystal alloy of sodium and potassium) or mercury. The constructions of the high-temperature fluid and diaphragm type intermediate device and ordinary type filled-in-liquid and diaphragm type intermediate device are identical to those shown in FIGS. 2 and 3. The fluid and diaphragm type multiple intermediate device of such arrangement enables not only positive transmission of the pressure from the fluid to be measured to the transmitter 200 but also the protection of the transmitter 200 from radiant ray damage.

The spirit and scope of the present invention cover a multiple arrangement of the pressure transmitting pipe 6 as well as pressure transmitting small diameter pipes 403 and 403'. Accordingly, the pressure transmitting fluid filled in pressure transmitting pipe may be such as having higher heat resistance than that of the filled-in-liquid in the pressure transmitting pipe on the side of the meter proper. Furthermore, the pressure-transmitting filled-in-fluid in the pressure transmitting pipe on the side of radiant ray source may be such as having higher anti-radiant ray property than that of the pressure-transmitting filled-in-liquid in the pressure transmitting pipe on the side of the meter proper. For instance, the pressure transmitting small diameter pipe having mercury filled therein as pressure transmitting medium may be provided on the side of radiant ray source, while the pressure transmitting pipe having Na-K filled therein may be provided on the side of meter proper.

Now, description will be given to novel protective means for the pressure receiving diaphragm. In the process control, the pressure of a fluid to be measured in the normal operation is maintained to a value higher than atmospheric pressure, whereas in the case of washing process, the valve 105 shown in FIG. 2 is opened to operate a vacuum pump 106, such that the fluid 102 to be measured is brought into a vacuum condition. This causes generation of gas, which has been dissolved in the filled-in-fluid in the fluid-contacting-portion, due to vacuum condition, thereby producing foams therein, while the pressure receiving diaphragm will be displaced to a great extent toward the side of the fluid to be measured whereby the pressure receiving diaphragm is abnormally deformed or broken. As a result, in case a plant is brought in an abnormal operation, there will result wrong or erroneous output signals from a transmitter. Accordingly, it is a prerequisite that, even in case the fluid to be measured is in a vacuum condition, the pressure receiving diaphragm be protected so that the deformation thereof may remain in an allowable range.

FIGS. 5 and 6 are longitudinal cross-sectional views of a pressure receiving consisting of conventional liquid-contacting-portion flange and pressure receiving diaphragm, while FIG. 5 shows the conditions of pressure receiving diaphragms 4 and 4', and FIG. 6 shows the abnormally displaced condition of the pressure receiving diaphragms 4 and 4' in case the fluid to be measured is brought in a vacuum condition. The reference numerals in FIGS. 5 and 6 are commonly used with FIGS. 2 and 3 for similar parts. Referring to FIG. 5, the pressure receiving diaphragms 4 and 4' are welded to the liquid-contacting flanges 5 and 5', respectively, to which flanges 3 and 3' are welded or coupled through packings 510 in gas-tight relation by using fastening means such as bolts. Defined in the inner walls of liquid-contacting flanges 5 and 5' on the side of pressure receiving diaphragms 4 and 4' are recessed portions 501 and 501' having the same corrugated configurations as those of pressure receiving diaphragms 4 and 4'. Filled-in-liquid 300 and 300' are provided in a space between the recessed portions 501 and 501' and the pressure receiving diaphragms 4 and 4', as well as in the pressure transmitting pipes 6 and 6' coupled to the flanges 5 and 5'. With such arrangement, even if the pressure of the fluid to be measured becomes excessive in the normal operation of a plant, the pressure receiving diaphragms 4 and 4' will rest on the recessed portions 501 and 501', thereby being protected from the abnormal displacement.

However, when shifted from the normal operation to the washing operation, the pressure P of the fluid to be measured will become negative, then there will be generated foams 500 in the filled-in-liquid 300 and 300' as shown in FIG. 6, whereby the pressure receiving diaphragms 4 and 4' will be displaced to a great extent to the side of the fluid to be measured, and thus the pressure receiving diaphragm may be subjected to abnormal deformation or failure. According to the present invention, there are provided recessed portions on the side of the fluid to be measured for the pressure receiving diaphragms 4 and 4', in such a manner that the diaphragms 4 and 4' may rest on the recessed portions.

FIGS. 7 and 8 are longitudinal cross-sectional views of a pressure receiving portion consisting of a fluid-contacting flange 5, 5' and a pressure receiving diaphragm 4, 4'. FIG. 7 shows the condition of the pressure receiving diaphragm 4, 4' in the normal operation, while FIG. 8 shows the condition of pressure receiving diaphragm 4, 4' in case the fluid to be measured is brought in vacuum condition. In passing, the reference numerals denoting similar parts are given in common throughout FIGS. 7 and 8 as well as FIGS. 5 and 6. In FIG. 7, shown at 600 and 600' are newly provided flanges or plate members on the side of fluid-contacting-portion-fluid to be measured, one sides of said flanges being welded to fluid-contacting flanges 5 and 5' in gas-tight relation, while the other sides thereof are welded or coupled through packings 510 to flanges 3 and 3' in gas-tight relation by using fastening means such as bolts. On the other hand, defined in the inner walls of the pressure receiving diaphragms 4 and 4' of flanges or plate members 600 and 600' on the side of the fluid to be measured are recessed portions 601 and 601' having the same corrugated configurations as those of the pressure receiving diaphragms 4 and 4'. Fluid to be measured is fed through comminucating ports 602 and 602' provided in the flanges or plate members 600 and 600' on the side of the fluid to be measured to fill the space between the recessed portions 601 and 601' and the pressure receiving diaphragms 4 and 4'. With such arrangement, as shown in FIG. 8, even if the fluid to be measured is brought in a vacuum condition (pressure P) to thereby cause foams 500 and 500' in the liquid 300 and 300' and to cause the pressure receiving diaphragms 4 and 4' to be displaced to the side of the fluid to be measured, the diaphragms 4 and 4' will rest on the recessed portions 601 and 601', such that the pressure receiving diaphragms 4 and 4' may be protected from abnormal deformation or failure. Accordingly, when the washing process is shifted to the normal operation in a plant, continuing accurate measurement of process factors may be effected by means of transmitter 200 as shown in FIG. 2.

As is apparent from the foregoing, according to the present invention, even in case the temperature of the fluid to be measured is as high as several hundred degrees centigrade, process factors such as pressure, liquid level or flow rate may be accurately measured by using conventional transmitter by the combined provisions of a high-temperature fluid and diaphragm type intermediate device and an ordinary filled-in-liquid and diaphragm type intermediate device for transmitting pressure. On the other hand, in the case of a high-temperature process in an atomic energy plant, an anti-radiant ray, filled-in-fluid and diaphragm type intermediate device is interposed between the high-temperature, filled-in-fluid and diaphragm type intermediate device and the ordinary filled-in-liquid and diaphragm type intermediate device, such that the process factors such as pressure, liquid level and flow rate may be accurately measured, and yet the aforesaid transmitter may be protected from the radiant ray damage. Furthermore, due to the provision of the fluid-contacting flanges on the side of fluid to be measured which are provided with communicating ports and recessed portions having the same corrugated configurations as those of the flanges on the side of fluid to be measured, the pressure diaphragms may be protected from abnormal deformation or failure, even in case the fluid to be measured is brought in a vacuum condition, while the process factors such as pressure, liquid level or flow rate may be accurately measured when a plant is in the normal operation.

What is claimed is:

1. A filled-in-fluid and diaphragm type intermediate device for transmitting pressure, comprising:
   a fluid-contacting flange on the side of a fluid to be measured;
   a pressure receiving element mounted on said fluid-contacting flange;
   a container having openings at the opposite ends thereof, one of said openings being coupled to said fluid-contacting flange and the other of said openings being coupled to a sealing flange mounting thereon a diaphragm on the side of a meter proper;
   at least one diaphragm midway of said container to define a pressure chamber;
   a first pressure transmitting fluid provided in said container between said pressure receiving element and said at least one diaphragm for transmitting a pressure of the fluid to be measured to the meter; and
   a second pressure transmitting fluid having different physical characteristics from that of said first pressure transmitting fluid being filled between said at least one diaphragm and the diphragm on the side of the meter proper.

2. A filled-in-fluid and diaphragm type intermediate device for transmitting pressure, as set forth in claim 1, further comprising means for protecting excessive deformation of the pressure receiving elements on at least one of a surface thereof facing the fluid-contacting flange or on a surface thereof facing the fluid to be measured.

3. A filled-in-fluid and diaphragm type intermediate device for transmitting pressure, as set forth in claim 2, wherein said means for preventing excessive deformation of the pressure receiving element is of substantially the same configuration as the pressure receiving element.

4. A filled-in-fluid and diaphragm type intermediate device for transmitting pressure, as set forth in claim 2, wherein said means for preventing excessive deformation includes a plate member disposed between said pressure receiving element and the fluid to be measured, said plate member being provided with a communicating port for communicating said pressure receiving element with the fluid to be measured.

5. A filled-in-fluid and diaphragm type intermediate device for transmitting pressure, as set forth in claim 4, wherein said plate member is provided with a plurality of recessed portions on a surface thereof facing said pressure receiving element.

6. A filled-in-fluid and diaphragm type intermediate device for transmitting pressure, as set forth in claim 1, wherein said first pressure transmitting fluid is high in heat resistance and will not be deteriorated nor gelated, yet presenting a low saturated vapor pressure.

7. A filled-in-fluid and diaphragm type intermediate device for transmitting pressure, as set forth in claim 1, wherein said first pressure transmitting fluid is a silicone oil.

8. A filled-in-fluid and diaphragm type intermediate device for transmitting pressure, as set forth in claim 1, wherein said first pressure transmitting fluid is such that will not be solidified when exposed to radiation of radiant rays.

9. A filled-in-fluid and diaphragm type intermediate device for transmitting pressure, as set forth in claim 1, wherein said first pressure transmitting fluid is NaK.

10. A filled-in-fluid and diaphragm type intermediate device for transmitting pressure, as set forth in claim 1, wherein said first pressure transmitting fluid is mercury.

11. A filled-in-fluid and diaphragm type intermediate device for transmitting pressure, as set forth in claim 1, wherein a heat radiating plate is provided on an outer wall of the container having openings at the opposite ends thereof.

12. A pressure transmitting arrangement as set forth in claim 1, wherein said first pressure transmitting fluid is mercury.

13. A filled-in-fluid and diaphragm type intermediate device for transmitting pressure comprising:
   a fluid-contacting flange on the side of a fluid to be measured;
   a pressure receiving element mounted on said fluid-contacting flange;
   a container having openings at the opposite ends thereof, one of said openings being coupled to said fluid-contacting flange and the other of said openings being coupled to a sealing flange mounted thereon a diaphragm on the side of a meter proper;
   pressure responsive means disposed in said container to define pressure chamber means;
   a first pressure transmitting fluid provided in said container between said pressure receiving element and said pressure responsive means for transmitting a pressure of the fluid to be measured to the meter;
   a second pressure transmitting fluid having different physical characteristics from the first pressure transmitting fluid being filled between said pressure responsive means and the diaphragm on the side of the meter proper; and
   a heat radiating plate provided on the outer wall of said container.

14. A pressure transmitting arrangement for transmitting pressures of a high temperature fluid, the arrangement comprising:
   a first pressure sensing element mounted in proximity to the high temperature fluid to be measured, a first pressure transmitting element having a pressure transmitting passage therein;

means for mounting said first pressure sensing element on one end of said pressure transmitting passage;

a second pressure sensing element;

means for mounting said second pressure sensing element on the other end of said pressure transmitting passage;

a first pressure transmitting fluid provided in said pressure transmitting passage between said first and said second pressure sensing elements;

a second pressure transmitting element having a pressure transmitting passage therein communicating at one end thereof with said second pressure sensing element and at the other end thereof with a measuring means;

means for mounting said second pressure transmitting element to said first pressure transmitting element; and a second pressure transmitting fluid having different physical characteristics from that of said first pressure transmitting fluid provided in said pressure transmitting passage of said second pressure transmitting element between said second sensing element and the measuring means.

15. An arrangement according to claim 14, further comprising means for preventing excessive deformation of said first pressure sensing element.

16. An arrangement according to claim 14, wherein said first pressure transmitting element includes an outer wall, and wherein a heat retarding plate is provided on said outer wall.

17. An arrangement according to claim 14, further comprising an additional pressure transmitting element having a pressure transmitting passage therein, said additional pressure transmitting element being interposed between said first and said second pressure transmitting elements, said pressure transmitting passage of said additional pressure transmitting element communicating with said pressure transmitting passages in said first and second pressure transmitting elements, and wherein a pressure transmitting fluid is disposed in said pressure transmitting passage of said additional pressure transmitting element.

18. An arrangement according to claim 17, wherein said pressure transmitting fluid provided in said pressure transmitting passage of said additional pressure transmitting element is an anti-radiant ray fluid.

19. An arrangement according to claim 18, wherein said first pressure transmitting fluid is a fluid high in heat resistance which will not deteriorate at a high temperature nor gelate and which presents a low saturated vapor pressure.

20. An arrangement according to claim 18, wherein said first pressure transmitting fluid is mercury.

21. An arrangement according to claim 18, wherein said second pressure transmitting fluid is NaK.

22. A pressure transmitting arrangement as set forth in claim 14, wherein said first pressure transmitting fluid is high in heat resistance and will not be deteriorated at a high temperature nor gelated, yet presenting low saturated vapor pressure.

23. A pressure transmitting arrangement as set forth in claim 14, wherein said first pressure transmitting fluid is a silicone oil.

24. A pressure transmitting arrangement as set forth in claim 14, wherein said first pressure transmitting fluid is a fluid which does not solidify when subjected to radiation of radiant rays.

25. A pressure transmitting arrangement as set forth in claim 14, wherein said first pressure transmitting fluid is NaK.

* * * * *